United States Patent
Saeed et al.

(10) Patent No.: US 9,530,042 B1
(45) Date of Patent: Dec. 27, 2016

(54) METHOD FOR FINGERPRINT CLASSIFICATION

(71) Applicant: KING SAUD UNIVERSITY, Riyadh (SA)

(72) Inventors: Fahman Saeed, Riyadh (SA); Muhammed Hussain, Riyadh (SA); Hatim A. Aboalsamh, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 15/181,357

(22) Filed: Jun. 13, 2016

(51) Int. Cl.
*G06K 9/00* (2006.01)
*G06K 9/66* (2006.01)
*G06F 17/30* (2006.01)

(52) U.S. Cl.
CPC ....... *G06K 9/00087* (2013.01); *G06F 17/3028* (2013.01); *G06F 17/30247* (2013.01); *G06K 9/00013* (2013.01); *G06K 9/00067* (2013.01); *G06K 9/66* (2013.01)

(58) Field of Classification Search
CPC ............ G06K 9/00087; G06K 9/00013; G06K 9/00067; G06K 9/66; G06F 17/30247; G06F 17/3028
See application file for complete search history.

(56) References Cited

U.S. PATENT DOCUMENTS

| | | | | |
|---|---|---|---|---|
| 5,953,443 A | * | 9/1999 | Hiratsuka | G06K 9/00087 340/5.83 |
| 6,282,304 B1 | * | 8/2001 | Novikov | G06F 3/03543 340/5.83 |
| 8,565,525 B2 | * | 10/2013 | Rossato | G06K 9/38 382/173 |
| 2005/0232472 A1 | | 10/2005 | Scholze | |
| 2011/0032341 A1 | * | 2/2011 | Ignatov | H04N 13/0033 348/51 |
| 2014/0314271 A1 | * | 10/2014 | Xu | G06K 9/00369 382/103 |

FOREIGN PATENT DOCUMENTS

| CN | 102799881 A | 11/2012 |
|---|---|---|
| CN | 104866815 A | 8/2015 |

OTHER PUBLICATIONS

Hong et al., "Fingerprint image enhancement: algorithm and performance evaluation," IEEE transactions on pattern analysis and machine, 1998.*

(Continued)

*Primary Examiner* — Shefali Goradia
(74) *Attorney, Agent, or Firm* — Richard C. Litman (57) ABSTRACT

The method for fingerprint classification uses a local gradient directional binary pattern (LGDBP) descriptor. The method acquires digital images of fingerprints from a scanner or the like, and the LGDBP descriptors corresponding to the directional ridge patterns are calculated. Using the LGDBP descriptors as a fingerprint representation, an extreme learning machine neural network with a radial basis function kernel may is used to reduce substantially the search space to a predefined number of classes of known fingerprints to be searched to identify the fingerprint.

5 Claims, 5 Drawing Sheets

(56) References Cited

OTHER PUBLICATIONS

Afsar et al., "Fingerprint identification and verification system using minutiae matching," National Conference on Emerging Technologies, 2004.*

Ahmed, "Gradient directional pattern: A robust feature descriptor for facial expression recognition," Electronics Letters, vol. 48, Issue: 19, pp. 1203-1204, Sep. 13, 2012.

Kumar et al., "Local Directional Pattern (LDP) Based Fingerprint Matching Using SLFNN," IEEE Second International Conference on Image Information Processing (ICIIP), 2013.

Guang-Bin Huang et al., "Extreme learning machine: Theory and applications", Neurocomputing (2006), vol. 70, pp. 489-501.

Guang-Bin Huang et al., "Extreme Learning Machine with Randomly Assigned RBF Kernels", International Journal of Information Technology (2005), vol. 11, No. 1, pp. 16-24.

\* cited by examiner

METHOD FOR FINGERPRINT CLASSIFICATION

BACKGROUND OF THE INVENTION

1. Field of the Invention

The present invention relates to biometric identification, and particularly to a method for fingerprint classification based on a local gradient directional binary pattern descriptor.

2. Description of the Related Art

Fingerprint recognition is used for either authentication or identification. In authentication, fingerprint matching is the automated verification of a match between two human fingerprints. Matching algorithms are used to compare previously stored templates of fingerprints against candidate fingerprints for authentication purposes. In order to do this, either the original image must be directly compared with the candidate image or certain features must be compared. In identification, an unknown fingerprint is compared with those of all subjects in the database to reveal the identity. Because of the growing size of fingerprint databases, one of the main problems of fingerprint recognition systems is the high processing complexity caused by its cross reference of fingerprints in the database.

The accuracy of fingerprint matching is dependent on the "noise" level of the image (i.e., the clarity and resolution of the scanned fingerprint image) as well as the pattern recognition approach selected for extracting features from the image and, further, from the selected method used to mathematically "describe" a particular feature in a useful manner. Given the complexities involved with pattern recognition, feature extraction and classification, being able to increase the accuracy of a fingerprint classification and matching system without having to greatly increase the computational power available is an area of great interest. Thus, a method for fingerprint classification solving the aforementioned problems is desired.

SUMMARY OF THE INVENTION

The method for fingerprint classification uses a local gradient directional binary pattern (LGDBP) descriptor. The method acquires digital images of fingerprints from a scanner or the like, and the LGDBP descriptors corresponding to the directional ridge patterns are calculated. Using the LGDBP descriptors as a fingerprint representation, an extreme learning machine neural network with a radial basis function kernel is used to substantially reduce the search space to a predefined number of classes of known fingerprints to identify the fingerprint.

The fingerprint image, FP, acquired from the scanner or the like, has a horizontal resolution of M pixels and a vertical resolution of N pixels. A set of responses for each $(i,j)$-th pixel of the fingerprint image FP, $G_k(i,j)$, are generated, where $1 \leq i \leq M$ and $1 \leq j \leq N$. The responses, $G_k(i,j)$, are generated by convolving the fingerprint image FP with a set of filters, $G_{\theta_k}$, for $k=1, \ldots, 8$, such that $G_k(i,j)=FP*G_{\theta_k}$ over $k=1, \ldots, 8$. Here, $G_{\theta_k}=G_x \cos \theta_k + G_y \sin \theta_k$, where $$\theta_k = (k-1)\frac{\pi}{8}$$

for $k=1, \ldots, 8$, and $G_x$ and $G_y$ are, respectively, horizontal and vertical Gaussian derivative filters respectively given by $$G_x = -\frac{x}{2\pi\sigma^4}e^{-\frac{x^2+y^2}{2\sigma^2}}$$

and $$G_y = -\frac{y}{2\pi\sigma^4}e^{-\frac{x^2+y^2}{2\sigma^2}}.$$

The parameter $\sigma$ is representative of width of a Gaussian function, specifically the breadth of the respective Gaussian filter functions. $\sigma$ preferably ranges between 0.1 and 0.5.

Each response $G_k(i,j)$ is thresholded such that, for each $(i,j)$-th pixel, if a value of the respective response $G_k(i,j)$ is greater than zero, then a corresponding thresholded value, $s_k$, is equal to one, and if the value of the respective response $G_k(i,j)$ is less than or equal to zero, then the corresponding thresholded value, $s_k$, is equal to zero. A local gradient directional binary pattern (LGDBP) code is then generated by forming a binary number from the values of $s_k$ over $k=1, \ldots, 8$ as $s_1 s_2 s_3 s_4 s_5 s_6 s_7 s_8$. A local gradient directional binary pattern code is generated for each $(i,j)$-th pixel. The distribution of LGDBP codes of all pixels in the fingerprint image FP is computed as a histogram, which forms the LGDBP descriptor.

Each fingerprint image is broken down by a grid into a plurality of blocks, e.g., a 3×3 grid, and the LGDBP descriptor for the blocks are concatenated. The concatenated descriptor is submitted to a neural network, specifically an extreme learning machine with a radial basis function (RBF) kernel. An extreme learning machine (ELM) is a single hidden layer feedforward neural network, in which the weights between input and hidden layers are randomly selected and are kept fixed, whereas the weight between the hidden and output layers are computed by solving a closed form problem.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method for fingerprint classification uses a local gradient directional binary pattern (LGDBP) descriptor. The method acquires digital images of fingerprints from a scanner or the like, and the LGDBP descriptors corresponding to the directional ridge patterns are calculated. Using the LGDBP descriptors as a fingerprint representation, an extreme learning machine neural network with a radial basis function kernel is used to substantially reduce the search space to a predefined number of classes of known fingerprints to identify the fingerprint.

The descriptor used in the present method for fingerprint classification is based on a local gradient directional binary pattern (LGDBP). In a fingerprint, gray level values vary in different directions along ridges, which can be used to construct a robust descriptor of a fingerprint. Using the variation in gray level values in different orientations, the present descriptor effectively captures the directional ridge patterns occurring in a fingerprint. The gradient of an image, f(x,y), is given by a vector, as follows:

$$\nabla f(x, y) = \begin{bmatrix} \dfrac{\partial f(x, y)}{\partial x} \\ \dfrac{\partial f(x, y)}{\partial y} \end{bmatrix}, \quad (1)$$

where $$\dfrac{\partial f(x, y)}{\partial x} \text{ and } \dfrac{\partial f(x, y)}{\partial y}$$

are the first order partial derivatives that encode only the gray scale changes along horizontal (0° orientation) and vertical (90° orientation) directions, respectively. The Gaussian function has a smoothing effect and is commonly used for noise suppression, so in the case of a noisy fingerprint, the partial derivatives of the Gaussian function are used to define the filter masks $$G_x, G_y \text{ of } \dfrac{\partial f(x, y)}{\partial x} \text{ and } \dfrac{\partial f(x, y)}{\partial y}$$

as follows:

$$G_x = -\dfrac{x}{2\pi\sigma^4} e^{-\dfrac{x^2+y^2}{2\sigma^2}} \quad (2)$$

$$G_y = -\dfrac{y}{2\pi\sigma^4} e^{-\dfrac{x^2+y^2}{2\sigma^2}}, \quad (3)$$

where $\sigma$ is a parameter of the Gaussian function and specifies the breadth of the function, which captures the maximum energy. Using equations (2) and (3), a filter mask for capturing the gray level variation along any arbitrary orientation $\theta$ is computed as:

$$G_\theta = G_x \cos\theta + G_y \sin\theta. \quad (4)$$

Equation (4) is employed for eight different orientations, namely $$\theta = 0, \dfrac{\pi}{8}, 2\dfrac{\pi}{8}, 3\dfrac{\pi}{8}, 4\dfrac{\pi}{8}, 5\dfrac{\pi}{8}, 6\dfrac{\pi}{8}, 7\dfrac{\pi}{8}.$$

This generates eight corresponding filters $G_{\theta_1}, G_{\theta_2}, G_{\theta_3}, G_{\theta_4}, G_{\theta_5}, G_{\theta_6}, G_{\theta_7}, G_{\theta_8}$, allowing their responses $G_1, G_2, G_3, G_4, G_5, G_6, G_7, G_8$ for a fingerprint to be computed. Using these responses, the directional binary pattern for each pixel with location (i,j) is computed for $1 \leq i \leq M$ and $1 \leq j \leq N$, where M×N is the spatial resolution of a fingerprint. This directional binary pattern is the local gradient directional binary pattern (LGDBP), which is used to develop the descriptor for the fingerprint.

The LGDBP descriptor is computed by first calculating the Gaussian gradient filters $G_x, G_y$ using equations (2) and (3). Then, the filter masks $G_{\theta_k}$ are calculated using equation (4) for the eight orientations of $\theta_k$ for k=1, . . . , 8. A fingerprint image, FP, is convolved with filters $G_{\theta_k}$ to compute the responses $G_k$ of these filters; i.e., $$G_k = FP * G_{\theta_k} \text{ for } k=1, \ldots, 8. \quad (5)$$

Corresponding to each pixel (i,j), for $1 \leq i \leq M$ and $1 \leq j \leq N$, the filter response values $G_1(i,j), \ldots, G_8(i,j)$ are thresholded using the following threshold function:

$$s(x) = \begin{cases} 1, & x > 0 \\ 0, & x \leq 0 \end{cases}, \quad (6)$$

allowing the LGDBP code to generated.

As an example, consider a sample fingerprint image which has the following filter response values for the (i,j)-th pixel: $G_1(i,f)=60$; $G_2(i,j)=-35$; $G_3(i,j)=95$; $G_4(i,j)=70$; $G_5(i,j)=-77$; $G_6(i,j)=-45$; $G_7(i,j)=45$; and $G_8(i,j)=66$. The corresponding eight thresholded values, $s_1$, are $s_1=1$; $s_2=0$; $s_3=1$; $s_4=1$; $s_5=0$; $s_6=0$; $s_7=1$; and $s_8=1$. The LGDBP code is then generated as the binary number $s_1\ s_2\ s_3\ s_4\ s_5\ s_6\ s_7\ s_8$. In this example, the LGDBP code is the binary number 10110011. This may be converted to its decimal value; i.e., 179. The distribution of the LGDBP codes are then computed as a histogram, and this histogram is the LGDBP descriptor of the fingerprint. It should be noted that for capturing the localized directional ridge patterns, the fingerprint is divided into a number of blocks (i.e., sub-images), e.g., a 3×3 grid. The LGDBP descriptors are computed from all blocks and concatenated to yield a feature vector of the fingerprint.

Figure 1:
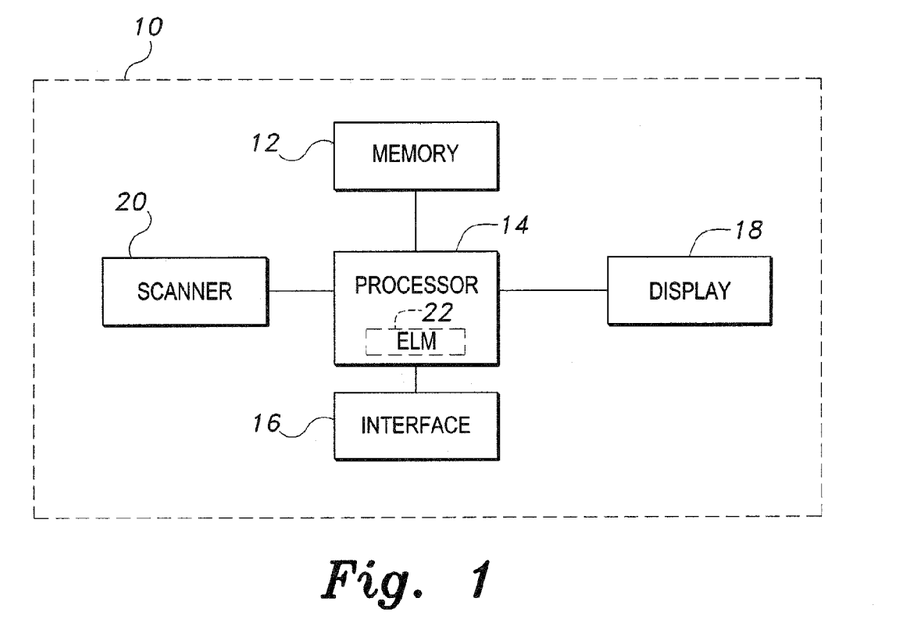
FIG. 1 is a block diagram showing system components for implementing a method for fingerprint classification according to the present invention.

It should be understood that the calculations may be performed by any suitable computer system, such as that diagrammatically shown in FIG. 1. Data is entered into system 10 via any suitable type of user interface 16, and may be stored in memory 12, which may be any suitable type of computer readable and programmable memory and is preferably a non-transitory, computer readable storage medium. Fingerprint images are provided by scanner 20, which may be any suitable type of image scanner or other optical device for recording fingerprint data from one or more fingers. Calculations are performed by processor 14, which may be any suitable type of computer processor and may be displayed to the user on display 18, which may be any suitable type of computer display. Processor 14 may be associated with, or incorporated into, any suitable type of computing device, for example, a personal computer or a programmable logic controller. The display 18, the processor 14, the scanner 20, the memory 12 and any associated computer readable recording media are in communication with one another by any suitable type of data bus, as is well known in the art. The system includes a neural network, specifically an extreme learning machine (ELM) 22 with a radial basis function (RBF) kernel, which may be implemented on the processor 14, or on a separate machine connected to the processor by Ethernet or by wireless network.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 12, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

After extracting features using the LGDBP descriptor, the extreme learning machine (ELM) 20 with a radial basis function (RBF) kernel is used for classification. ELM is a single hidden layer feedforward neural network, where the weights between input and hidden layers are randomly selected and are kept fixed, whereas the weight between the hidden and output layers are computed by solving a closed form problem. The learning speed of ELM is much faster than that of the conventional feedforward network, which use learning algorithms such as back-propagation (BP).

To evaluate the present method for fingerprint classification and matching, the benchmark database FVC2004 was used. The FVC2004 database contains noisy images acquired by live scan devices. The database has four sub-databases: DB1, DB2, DB3 and DB4. Each sub-database contains 880 fingerprint images which are classified into four categories: arch, left loop, right loop and whorl. ELM with a RBF kernel was used for classification. In order to validate the performance of the method, the data was divided with 90% for training and 10% for testing. The LGDBP descriptor was calculated for each training and testing fingerprint, and the two parameters affecting the ELM classifier (i.e., the kernel parameter and the regularization coefficient) were tuned using 80% of the training data. After tuning the parameters of the ELM and training it using the training data, the accuracy was calculated with testing data. This procedure was repeated 100 times by randomly partitioning the data into training and testing data sets. The average accuracy and standard deviation were then calculated.

There are two parameters affecting the discriminative ability of the LGDBP descriptor: the number of blocks of the fingerprint image, and σ, the Gaussian function parameter. A number of blocks of different sizes were tested and, as shown below in Table 1, the most suitable size was found to be 4×4, which includes most of the discriminative directional ridge patterns. Table 1 below gives the classification accuracy (acc) and standard deviation (std) for the FVC-2004-DB1 sub-database with differing block sizes (acc±std).

TABLE 1

Classification Accuracy for Differing Block Sizes

| Block Size | 1 × 1 | 2 × 2 | 3 × 3 | 4 × 4 | 5 × 5 |
| --- | --- | --- | --- | --- | --- |
| With enhancement | 97.36 ± 2 | 97.85 ± 1.44 | 98.12 ± 1.24 | 98.37 ± 1.18 | 98.27 ± 1.17 |
| Without enhancement | 96.27 ± 3.18 | 96.82 ± 2.39 | 97.15 ± 1.82 | 97.27 ± 1.69 | 97.17 ± 1.8 |

Figure 2A:
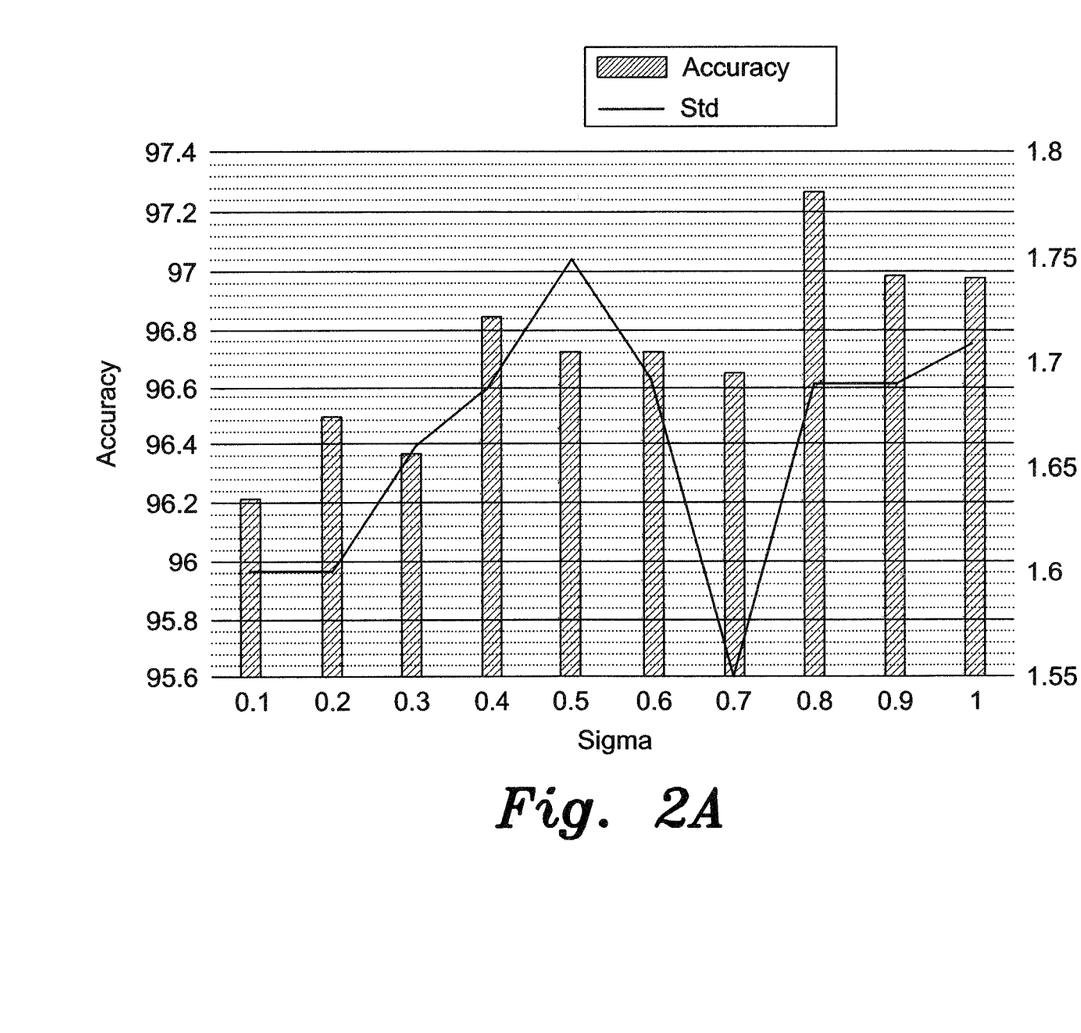
FIG. 2A is a graph illustrating classification accuracy of fingerprint classification for a control set of fingerprint images.
Figure 2B:
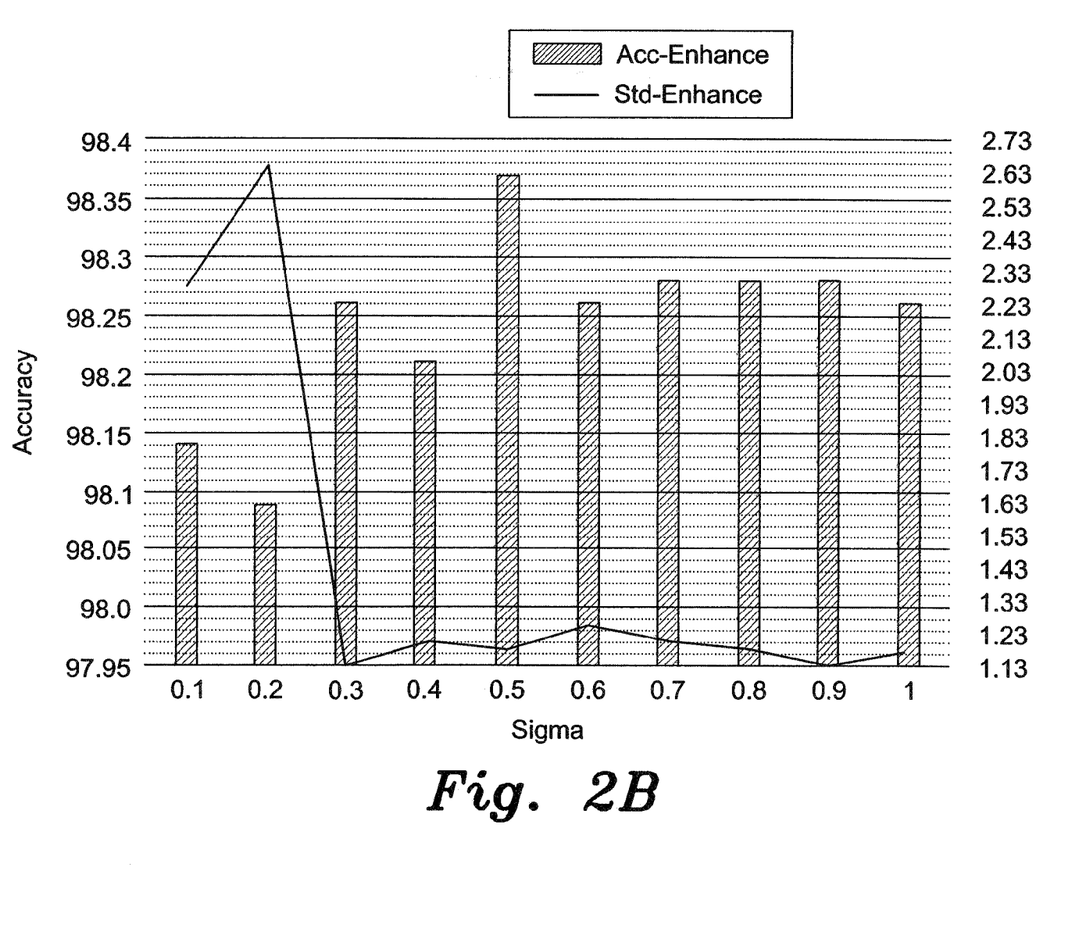
FIG. 2B is a graph illustrating classification accuracy of fingerprint classification using the method for fingerprint classification according to the present invention.

Sub-database DB1 was tested with σ=0.1, 0.2, . . . , 1 keeping the number of blocks fixed to 4×4, both with enhancement of the fingerprints (i.e., using the present method) and without enhancement (i.e., without using the present method, tested as a control set). The average accuracy (along with standard deviation) for each value of σ is shown in FIG. 2A (without enhancement) and FIG. 2B (with enhancement). It can be clearly seen that σ=0.5 captures the ridge patterns optimally and returns an accuracy of 98.37±1.18 with enhancement and σ=0.8 returns an accuracy of 97.27±1.69 without enhancement.

Figure 3:
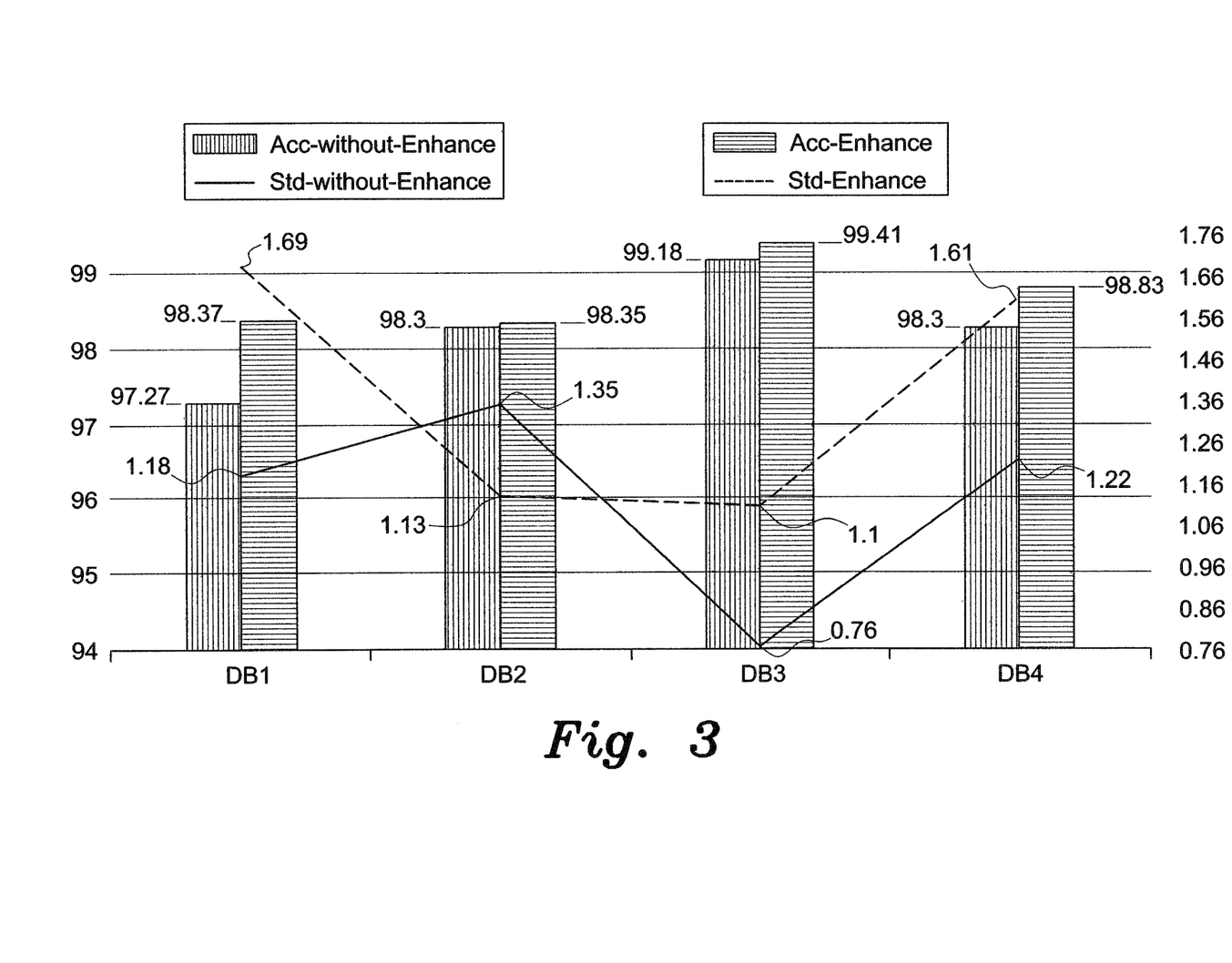
FIG. 3 compares classification accuracy of fingerprint classification for a control set of fingerprint images against the method for fingerprint classification for four separate fingerprint image sub-databases.
Figure 4:
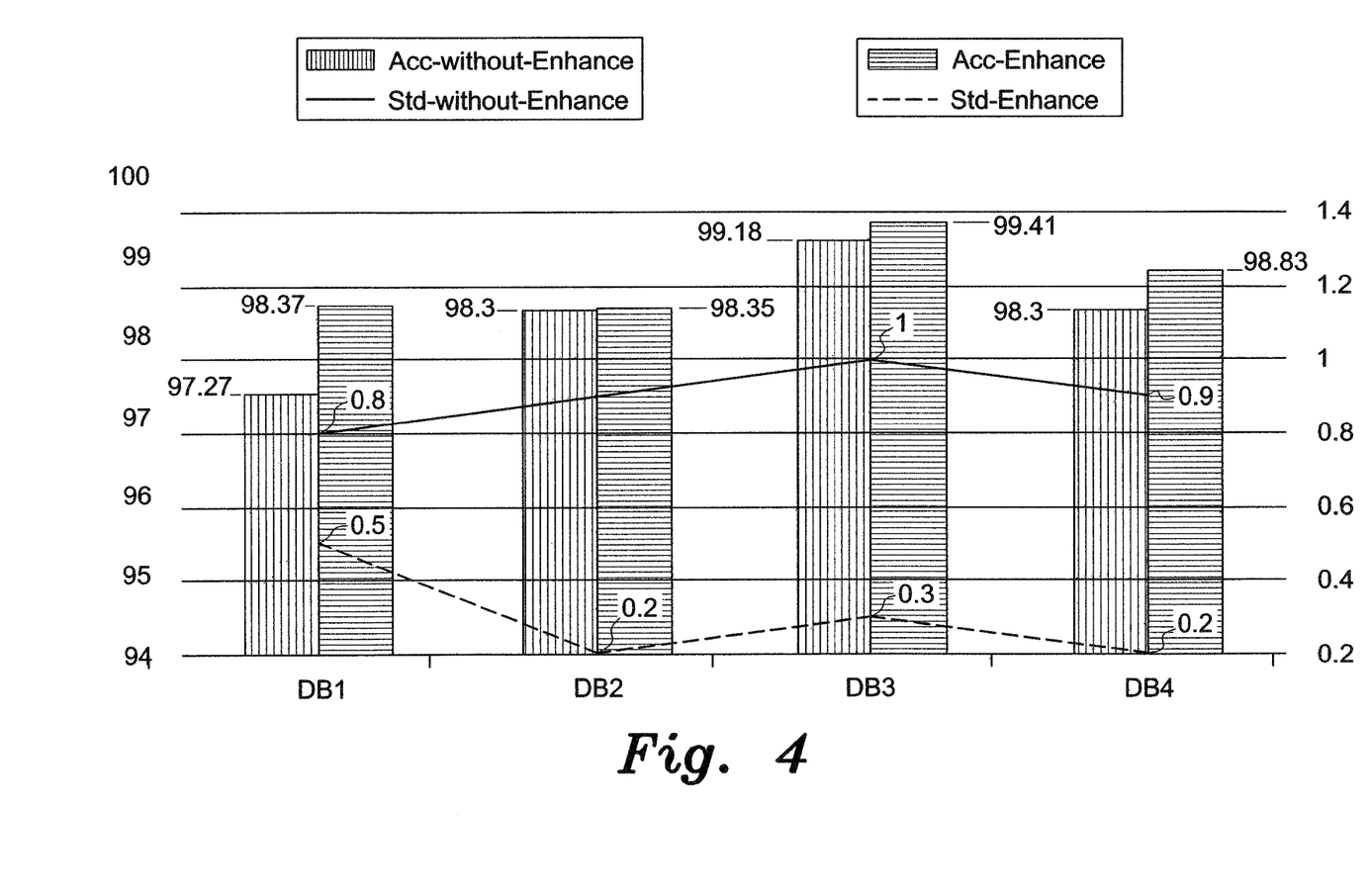
FIG. 4 compares classification accuracy of fingerprint classification for a control set of fingerprint images against the method for fingerprint classification for four separate fingerprint image sub-databases and for varying values of the a parameter.

Sub-databases DB1, DB2, DB3 and DB4 were each tested with 4×4 blocks and the average of classification accuracy was found to be 98.74±1.13 with enhancement of the fingerprints, and 98.26±1.38 without the enhancement. These results are shown in FIG. 3. Here, a σ with smaller values, ranging between 0.1 and 0.5, has more of an effect in capturing the ridge pattern in enhanced fingerprints, whereas a σ with large values, ranging between 0.8 and 1, has a greater impact for fingerprints without enhancement, as shown in FIG. 4. It can be seen that the LGDBP descriptor encodes the localized ridge patterns more accurately.

It is to be understood that the present invention is not limited to the embodiments described above, but encompasses any and all embodiments within the scope of the following claims.

We claim:

1. A method for fingerprint classification, comprising the steps of:

scanning a fingerprint to generate a fingerprint image, FP, having a horizontal resolution of M pixels and a vertical resolution of N pixels;

generating a set of responses for each (i,j)-th pixel of the fingerprint image FP, $G_k(i,j)$, where $1 \le i \le M$ and $1 \le j \le N$, by convolving the fingerprint image FP with a set of filters, $G_{\theta_k}$, for k=1, . . . , 8, such that $G_k(i,j)=FP*G_{\theta_k}$ over k=1, . . . , 8, wherein $G_{\theta_k}=G_x \cos \theta_k + G_y \sin \theta_k$, where $$\theta_k = (k-1)\frac{\pi}{8}$$

for k=1, . . . , 8, and $G_x$ and $G_y$ are, respectively, horizontal and vertical Gaussian derivative filters respectively given by $$G_x = -\frac{x}{2\pi\sigma^4}e^{-\frac{x^2+y^2}{2\sigma^2}} \text{ and } G_y = -\frac{y}{2\pi\sigma^4}e^{-\frac{x^2+y^2}{2\sigma^2}},$$

where σ is a parameter representative of width of a Gaussian function;

thresholding each response $G_k(i,j)$ such that, for each (i,j)-th pixel, if a value of the respective response $G_k(i,j)$ is greater than zero, then a corresponding thresholded value, $s_k$, is equal to one, and if the value of the respective response $G_k(i,j)$ is less than or equal to zero, then the corresponding thresholded value, $s_k$, is equal to zero;

generating a local gradient directional binary pattern code by forming a binary number from the values of $s_k$ over k=1, . . . , 8 as $s_1 s_2 s_3 s_4 s_5 s_6 s_7 s_8$;

generating a local gradient directional binary pattern code for each (i,j)-th pixel;

computing a distribution of the local gradient directional binary pattern codes for all said pixels in the fingerprint image FP as a histogram and forms descriptor; and using the histogram and forms descriptor and a neural network to reduce substantially a search space to a predefined number of classes of fingerprints to be searched in order to identify the scanned fingerprint.

2. The method for fingerprint classification as recited in claim 1, wherein the neural network comprises an extreme learning machine having a radial basis function kernel.

3. The method for fingerprint classification as recited in claim 1, wherein a value of σ ranges between 0.1 and 0.5.

4. A system for fingerprint classification, comprising:

a scanner for providing a digital image of a scanned fingerprint;

a processor connected to the scanner, the processor having:

means for dividing the scanned image into a plurality of blocks corresponding to a unique section of the scanned image;

means for using Gaussian filters to quantify gray level changes along ridges in the scanned image;

means for using filter masks to compute directional binary pattern radially from each pixel in eight directions;

means for convolving the scanned fingerprint image with the filter masks to obtain filter responses;

means for thresholding the filter responses for each of the pixels in a block;

means for computing a local gradient directional binary pattern descriptor from the thresholded filter responses for each of the blocks; and means for concatenating the local gradient directional binary pattern descriptors for the blocks; and a neural network connected to the processor, the neural network having means for reducing a search space to a predefined number of classes of known fingerprints from the concatenated local gradient directional binary pattern descriptors in order to reduce time and effort required to identify the scanned fingerprint image.

5. The system for fingerprint classification as recited in claim 4, wherein said neural network comprises an extreme learning machine having a radial basis function kernel.

* * * * *